US008649398B2

United States Patent
Shafai et al.

(10) Patent No.: US 8,649,398 B2
(45) Date of Patent: Feb. 11, 2014

(54) PACKET NETWORK INTERFACE APPARATUS AND METHOD

(75) Inventors: Farhad Shafai, Kanata (CA); Jason Coppens, Ottawa (CA)

(73) Assignee: Xilinx, Inc., San Jose, CA (US)

( * ) Notice: Subject to any disclaimer, the term of this patent is extended or adjusted under 35 U.S.C. 154(b) by 331 days.

(21) Appl. No.: 13/047,511

(22) Filed: Mar. 14, 2011

(65) Prior Publication Data

US 2012/0236878 A1    Sep. 20, 2012

(51) Int. Cl.
*H04J 3/24* (2006.01)
*H04J 3/06* (2006.01)
*H04J 3/04* (2006.01)
*G06F 15/16* (2006.01)

(52) U.S. Cl.
USPC ............ 370/474; 370/536; 370/503; 709/200

(58) Field of Classification Search
USPC .......... 370/474, 466, 536, 503; 709/204, 249, 709/200
See application file for complete search history.

(56) References Cited

U.S. PATENT DOCUMENTS

| 6,044,087 | A | 3/2000 | Muller et al. |
| 6,260,073 | B1* | 7/2001 | Walker et al. ................. 709/249 |
| 7,095,737 | B2 | 8/2006 | Lo |
| 7,787,481 | B1 | 8/2010 | Liang |
| 8,230,014 | B2* | 7/2012 | Uchikawa ...................... 709/204 |
| 8,320,412 | B2* | 11/2012 | Li .................................. 370/503 |
| 8,401,043 | B1* | 3/2013 | Kadosh et al. ................ 370/536 |
| 8,411,703 | B1* | 4/2013 | Cory .............................. 370/503 |
| 2004/0156390 | A1* | 8/2004 | Prasad et al. .................. 370/466 |
| 2007/0211750 | A1 | 9/2007 | Li et al. |
| 2009/0274172 | A1 | 11/2009 | Shen et al. |
| 2012/0236878 | A1* | 9/2012 | Shafai et al. .................. 370/474 |

* cited by examiner

*Primary Examiner* — Jung Park
*Assistant Examiner* — Albert Shih
(74) *Attorney, Agent, or Firm* — Richard J. Mitchell; LeRoy D. Maunu; Lois D. Cartier

(57) ABSTRACT

A packet network interface apparatus includes a media access control (MAC) module for constructing a packet for transmission over a packet network and a physical coding sublayer (PCS) module for encoding the packet for transmission over a physical interface. An inter packet gap module located between the MAC module and the PCS module directly transfers data to the PCS module while maintaining a certain inter packet gap by deleting or inserting idle characters. The inter packet gap module has at least one memory module for temporary storage of packet data. The modules preferably operate in a common time domain.

23 Claims, 3 Drawing Sheets

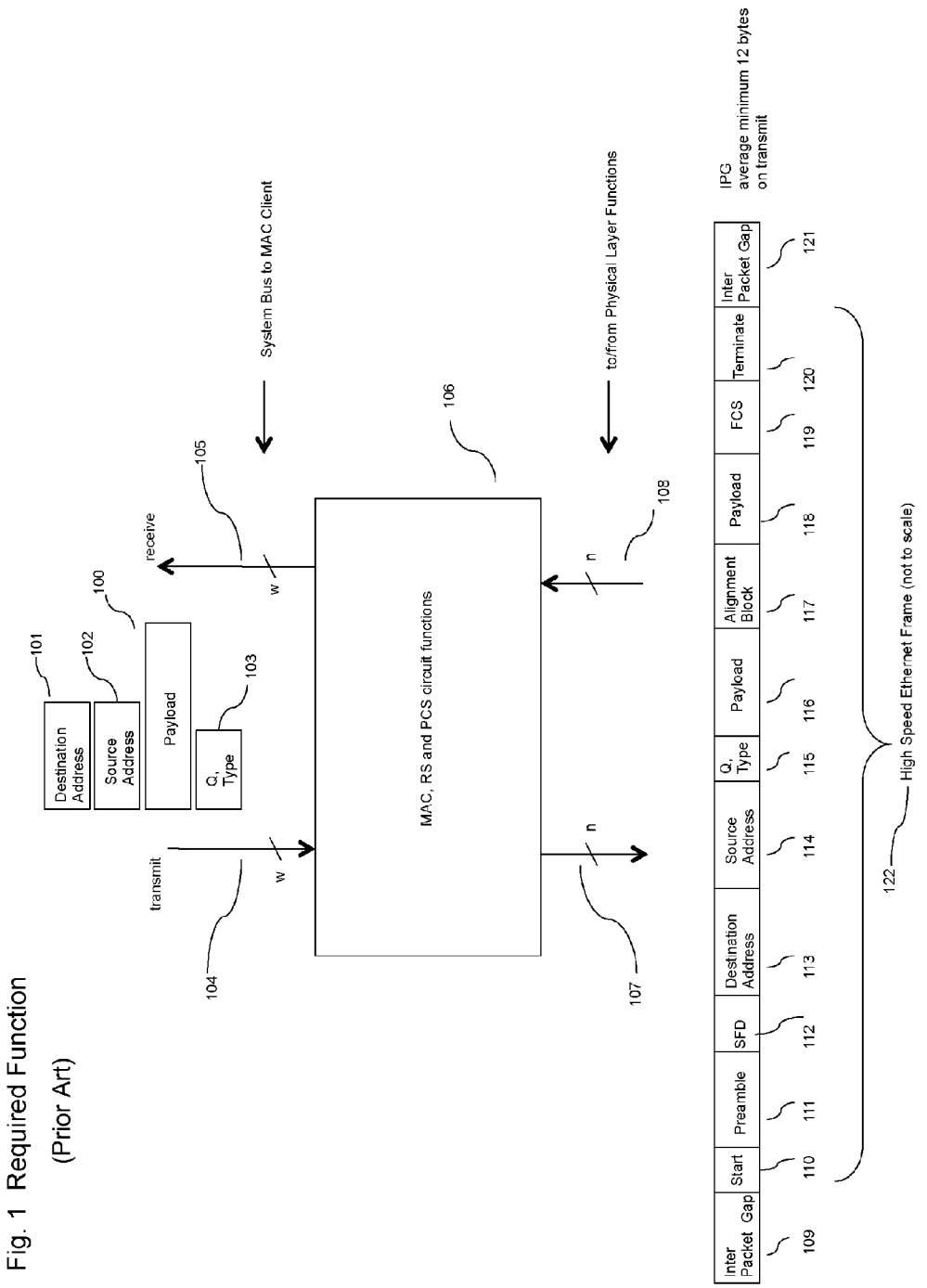
Fig. 1 Required Function (Prior Art)

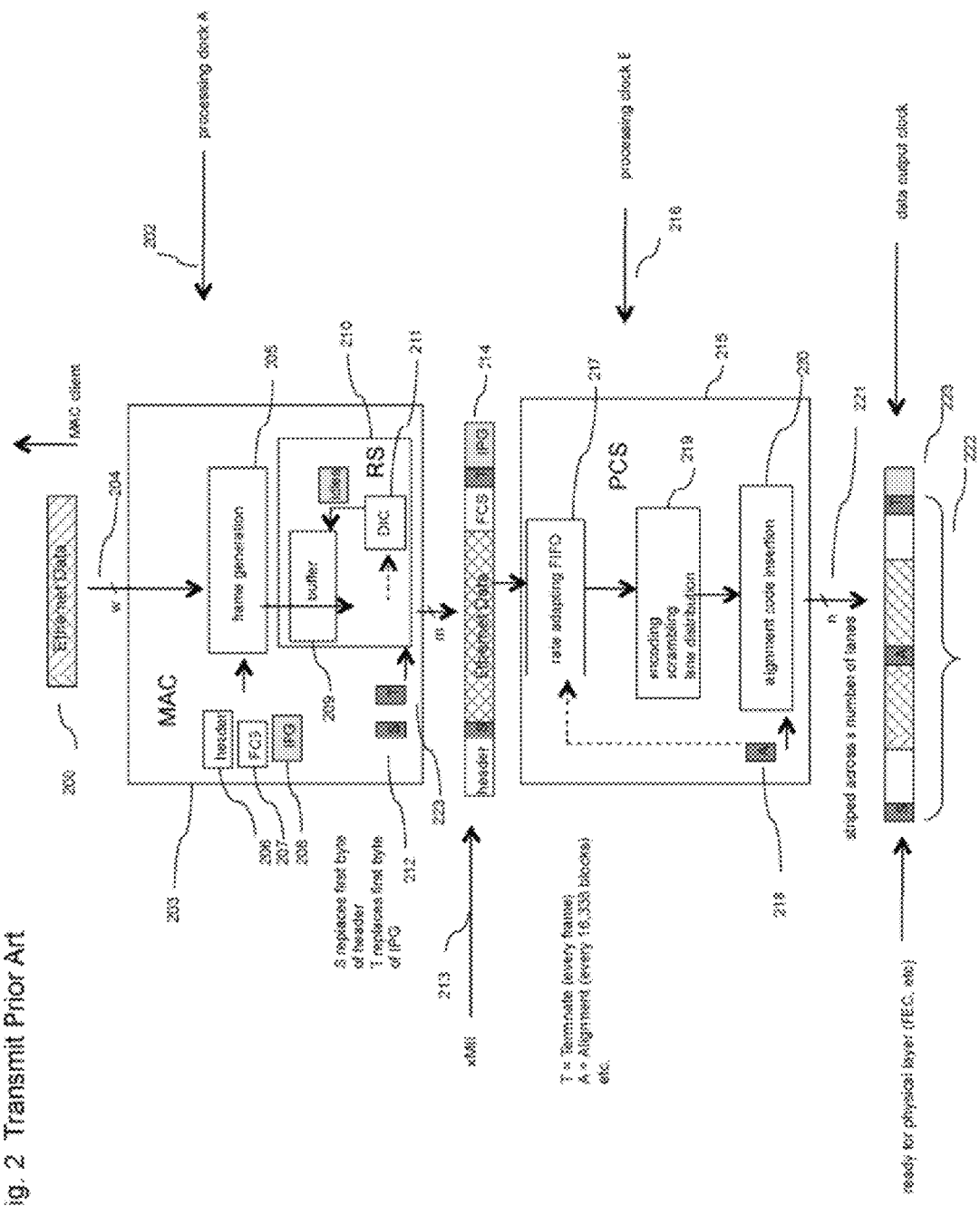
Fig. 2 Transmit Prior Art

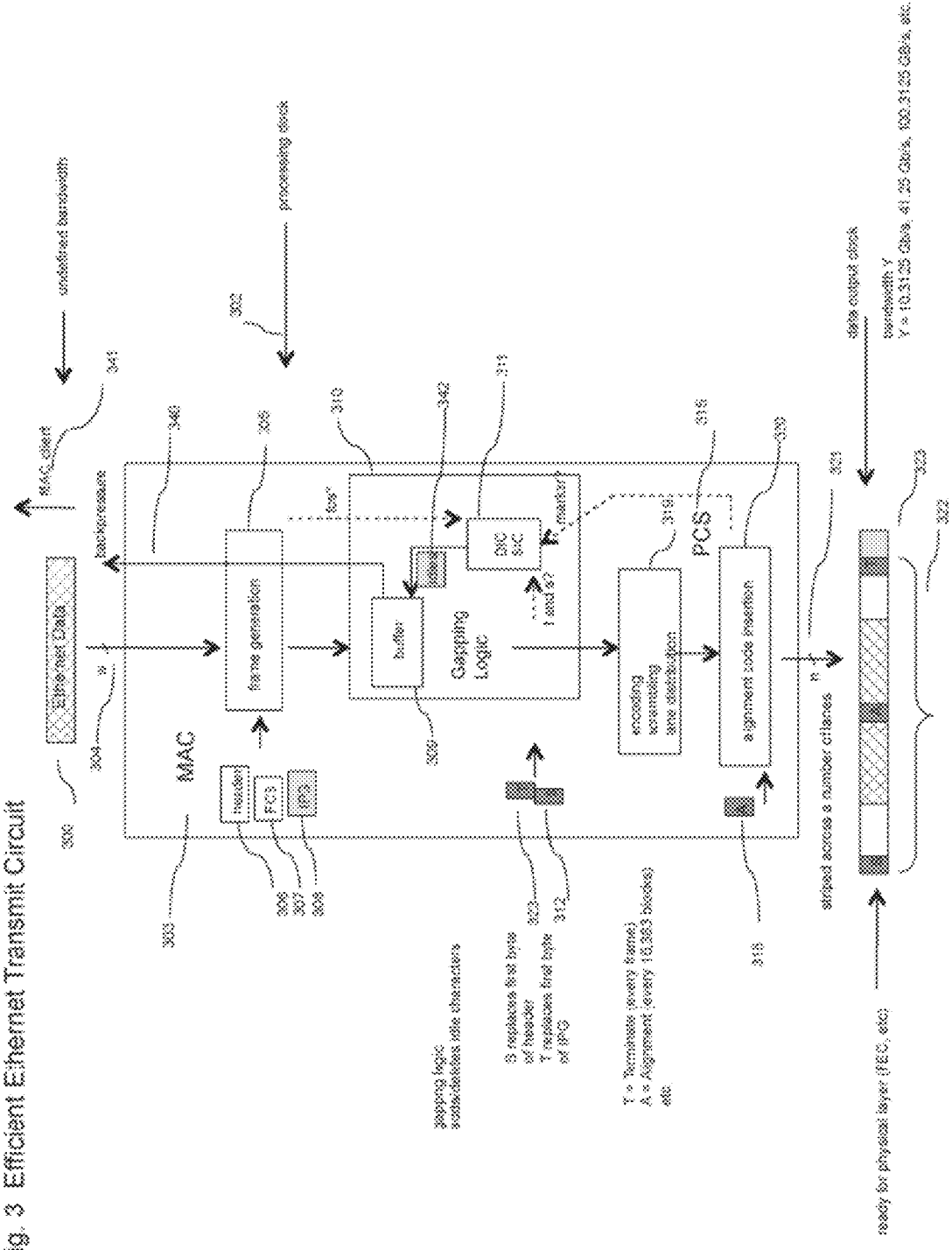

PACKET NETWORK INTERFACE APPARATUS AND METHOD

FIELD OF THE INVENTION

This invention relates to data communication systems, and in particular to packet network interface circuits, such as high speed Ethernet interface circuits.

BACKGROUND OF THE INVENTION

Ethernet is a family of frame-based computer networking technologies for local area networks (LAN). It defines a number of wiring and signaling standards for the Physical Layer of the OSI networking model as well as a common addressing format and Media Access Control at the Data Link Layer.

The IEEE 802.3 standard, which is herein incorporated by reference, specifies the data format for Ethernet frames at various interfaces. For example, FIG. 82-3—PCS Transmit bit ordering, illustrates the required format of data blocks at the egress of the PCS.

FIG. 1 illustrates the required function of the MAC (Media Access Control) and PCS (Physical Coding Sublayer) as present in high-speed technologies such as 10 Gb/s (Giga-bits per second), 40 Gb/s, and 100 Gb/s Ethernet. The functions of the MAC and PCS are well known and are briefly described as follows.

In FIG. 1, the Ethernet data interface to the MAC and PCS may include a payload 100 consisting typically of 46 to 1500 bytes; a destination address 101 consisting typically of 6 bytes; a source address 102 consisting typically of 6 bytes; an optional 802.1Q tag and Ethertype 103 consisting typically of 6 or more bytes. These inputs are meant to illustrate and therefore the length and description of these Ethernet inputs do not limit the scope of the present invention. The Ethernet data bytes are input to the MAC and PCS on a transmit data bus 104 with a width w and output from the MAC and PCS on a receive data bus 105. The width w is specific to the particular implementation and may include additional control information as required (for example for maintenance and identifying the Ethernet data bytes).

In FIG. 1, the MAC and PCS circuit 106 functions to generate and decode the high speed Ethernet frame 122 format according to a specific Ethernet technology (for example 40 Gb/s or 100 Gb/s over fiber optics). The PCS function includes formatting and decoding the frame 122 correctly to be transmitted on 107 and received from 108 a number of physical lanes n, where n may be 1, 4, 10, or any other integer according to the specific Ethernet technology. The Ethernet frame 122 is encoded, scrambled, and striped across the n lanes 107 according to a predefined sequence by the PCS in the transmit direction. The PCS performs the reverse function in the receive direction.

The Ethernet frame 122 is constructed according to the applicable Ethernet specification clause, and typically includes the following groups of octets: a Start octet 110; a sequence of 6 Preamble octets 111; a Start of Frame Delimiter octet 112; a Destination Address of 6 octets 113; a Source Address of 6 octets 114; a Payload 116, 118 of 46 to 1500 octets total; a Frame Check Sequence 119 of 4 octets; and a Terminate character 120. There is also required to be an IPG (Inter Packet Gap) 121, 109 between occurrences of the Ethernet frame. The IPG consists of idle characters and is required to be an average of 12 octets minimum. Additionally, there are periodic Alignment Blocks 117, which may occur at any time during transmission, and are inserted between scheduled octets. They do not replace octets. For example, according to one issue of the Ethernet standard, a single Alignment Block is inserted into each lane every 16,383 blocks.

The receive function of FIG. 1 is substantially the reverse of the transmit function. That is to say, where the transmitter constructs and formats the Ethernet frame 122 from the incoming Ethernet data 104, the receiver decodes and disassembles the Ethernet frame 122 and sends Ethernet data 105 to the MAC client. Additional functions of the receiver such as the checking of the FCS 119 and the lane alignment process using the alignment block 117 are not within the scope of the present invention.

A challenge in generating the required sequence of octets in the transmit direction is to maintain the necessary minimum IPG when constructing the frame.

A more detailed view of the MAC and PCS circuits for the transmit direction is illustrated in FIG. 2, which shows a typical prior art implementation of the transmitter functions.

In FIG. 2, Ethernet data 200 from a MAC client is received by the MAC 203 module over a bus 204 of width w. The MAC frame generation circuit 205 functions to construct the Ethernet frame for transmission by prepending and appending information such as a header 206, FCS 207, and providing idle characters 208 between frames. The header consists of the Preamble and Start of Frame Delimiters as described by FIG. 1. It is then a function of the RS (Reconciliation Sublayer) 210 to format the Ethernet frame for transmission to the PCS module 215 over media independent interface ("xMII") interface 213. The term xMII may refer to XGMII for 10 Gb/s Ethernet, XLGMII for 40 Gb/s Ethernet, or CGMII for 100 Gb/s Ethernet, depending on the Ethernet technology being implemented, or any other MII type of Ethernet interface as may be specified in future revisions of the IEEE 802.3 specification. The xMII interface consists of m lanes for Ethernet frame data, where m is typically 4 or 8 or a multiple of 8. Each lane transfers 8 bits in parallel (at one time). The MAC and PCS modules are clocked in different clock domains A and B.

The RS 210 typically includes a buffer circuit 209, which serves to temporarily store the octets comprising the Ethernet frame and then forward them to the xMII interface at the correct time according to a striping schedule. The RS circuit 210 arranges the Ethernet frame over the xMII interface in such a way that said frame will begin with the first octet of the header 206 in the first lane of the xMII interface 213. In so doing, the first octet of the preamble is replaced with a Start octet 212. The time for this to occur is controlled by the buffer 209 in response to the striping schedule. The remaining octets are transmitted over the xMII in a pre-determined sequence until the last octet of the FCS 207 has been transmitted. This will be followed by a Terminate octet 223 which replaces the first idle character of the inter packet gap.

Since the Ethernet frame may contain any integral number of octets (within certain pre-defined limits), the Terminate octet 223 may exist in any lane of the xMII interface. However, a rule exists that the Start octet shall occur in the first lane of the xMII interface. Therefore the required minimum 12 octets of IPG 208 may not be precisely achieved, since some idle octets may have to be inserted or deleted in order to present the next Start octet on the first lane of the xMII interface. Since a rule states that only an average of 12 octets minimum must be achieved, a Deficit Idle Counter (DIC) 211 is used to keep track of the idle octets inserted or deleted. Information from the DIC controls the readout schedule from the buffer 209. Thus the xMII data rate will be the same as the MAC data rate on average. The DIC 211 is adjusted depending on which lane the start character has been shifted to and the terminate location.

It is noted that in some prior art embodiments, the xMII interface is not a physical interface, but exists logically within an integrated circuit.

Continuing with FIG. 2, the transmit PCS 215 functions to arrange the m xMII data lanes 213 for transmission over a physical interface 221 consisting of n lanes. The main functions include encoding, scrambling, lane distribution 219, and alignment code insertion 220. Since the insertion of alignment codes 218 results in extra bandwidth, a rate adapting FIFO 217 is required to periodically add or delete idle characters. Furthermore, since the MAC processing clock 202 and PCS processing clock 216 may be different, the rate adapting FIFO 217 also serves to add or delete idle characters in order to maintain uninterrupted data flow to the physical medium, where data includes the Ethernet frame and idle characters. It is noted that idle characters are required to be deleted or inserted by the PCS in groups of 8 (one block). This ensures that the Start character for an Ethernet frame will remain at the start of a PCS lane.

The transmitted Ethernet frame 222 including all control characters and the IPG 223 (all of which were formatted by the PCS) are striped across the n lanes of the physical medium 221 in a predefined sequence which is known to those skilled in the art. The value of n is typically 1, 4, or 10 depending on the type of physical interface.

SUMMARY OF THE INVENTION

According to the present invention there is provided a packet network interface apparatus, comprising a media access control (MAC) module for constructing a packet for transmission over a packet network; a physical coding sublayer (PCS) module for encoding the packet for transmission over a physical interface; and an inter packet gap module between the MAC module and the PCS module for directly transferring data to the PCS module while maintaining a certain inter packet gap by deleting or inserting idle characters, said inter packet gap module comprising at least one memory module for temporary storage of packet data.

Embodiments of the present invention are an improvement over the prior art in the following respects. All processing may be performed within a single clock domain. This allows for the elimination of the rate adapting FIFO resulting in a smaller circuit. Second, the xMII interface is avoided as a physical interface and exists only logically. This allows processing steps to be avoided with a corresponding reduction in circuitry. Third, the MAC and PCS functions may be integrated in a new way such that overall circuitry is reduced.

The intermediate interface between the MAC and PCS can be greatly simplified when both are implemented on a single common integrated circuit.

According to another aspect of the invention there is provided method of establishing connection between a client and a physical interface in a packet network, comprising constructing a packet for transmission over a packet network in a media access control (MAC) module; encoding the packet for transmission over a physical interface in a physical coding sublayer (PCS) module; and directly transferring data to the PCS module under the control of an inter packet gap module that buffers the data in blocks sized for processing by the PCS and maintains a certain inter packet gap by deleting or inserting idle characters; and wherein the modules operate in a common time domain.

BRIEF DESCRIPTION OF THE DRAWINGS

The invention will now be described in more detail, by way of example only, with reference to the accompanying drawings, in which:

FIG. 1 illustrates the interfaces to the MAC and PCS circuits including the required Ethernet frame structure on the line;

FIG. 2 illustrates a prior art circuit for the MAC and PCS including an intermediate xMII interface; and FIG. 3 illustrates an efficient circuit for a MAC and PCS interface in accordance with one embodiment of the invention.

DETAILED DESCRIPTION OF THE INVENTION

In this disclosure, the terms byte, octet, and character may be considered equivalent; the term block refers to a group of 8 bytes (64 bits) before the PCS and encoded into 66 bits after the PCS; IPG (Inter Packet Gap) and IFG (Inter Frame Gap) may be considered equivalent; packet and frame may be considered equivalent; the IPG includes idle characters; Gb/s means gigabits per second. The term circuit is used in a general sense to include both hardware and software implementations.

The exemplary embodiment is described using specific values for certain parameters, such as the size of a block and the size of an IPG. It is to be understood that these values are meant to illustrate and do not limit the scope of the invention to other parameter values, which may be changed from time to time according to future revisions of the IEEE 802.3 specification.

Referring to FIG. 3, the interface circuit receives Ethernet data 300 from a MAC client. The interface to said MAC client is a bus 304 of width w, which may be considered logically the same as in the prior art for better understanding of its compatibility with the present invention. The width w is specific to a particular system implementation and may include additional control information as required, for example, for maintenance and identifying the Ethernet data bytes as well as Ethernet data. The frame generation circuit 305 functions to format the Ethernet frame by prepending a header 306, which includes the preamble and start of frame delimiter of FIG. 1, appending an FCS 307, and maintaining an IPG 308 between frames. The frame generation logic 305 constructs the Ethernet frame according to the IEEE 802.3 Ethernet standard in a manner known to persons skilled in the art.

The interface circuit contains a novel Gapping Logic 310. The gapping logic circuit 310 takes care of moving data through the MAC and PCS functions more efficiently than the prior art implementation that employs an RS. The parts of the gapping logic circuit will now be described.

The Ethernet frame constructed by the MAC is temporarily stored in a buffer 309. One of the functions of the buffer is to keep track of its fill level to ensure that all Ethernet data can be processed. This is necessary because the common processing clock 302 for all circuits of is not required to be the same as that of the MAC client 341, which may have an undefined bandwidth. Therefore the buffer 309, which may comprise at least one memory unit, generates a backpressure signal 340 to indicate to the MAC client to temporarily cease sending data to the MAC in the event that said buffer approaches its maximum capacity.

In the event that the MAC client is unable to provide Ethernet frame data in a timely manner, resulting in an underflow condition of the buffer 309, then the PCS 315 will be unable to complete the encoding of the frame in contiguous blocks. The IEEE 802.3 specification requires that this event will cause the PCS to generate error blocks in order that the corresponding receiver will recognize the underflow condition and respond accordingly. When there is a long interval between complete Ethernet fames, possibly causing a buffer underflow, there is no error condition. The transmitter simply begins idle character insertion which may continue indefinitely since there is no maximum specified inter packet gap.

The gapping logic, also referred to as the inter packet gap module, 310 functions to read data from the buffer 309 (removing it from temporary storage) according to a schedule which ensures that the beginning of an Ethernet frame occurs at the start of a block of data. A block of data consists of 64 bits at this point in the logic. At the same time, the first character of the Ethernet frame (the first octet of the preamble) is replaced with a Start character 312. Under normal conditions (no overflow or underflow), the gapping logic continues to read Ethernet frame data from the buffer continuously until the last character of the appended FCS 307 has been reached. At this point a Terminate character 323 is inserted. The terminate character is followed by the idle characters of the IPG 308 until the next Ethernet frame. Data is read from the buffer in blocks (64 bits) at one time for transfer to the PCS 315 for encoding. The buffer 309 ensures that the start character is placed at the start of a block of data that is read out for the PCS. In some embodiments, data is read from the buffer in an integral number of blocks at one time for transfer to the PCS.

The payload of an Ethernet frame may contain any integral number of bytes within certain predefined limits, and therefore the terminate character 323 may occur anywhere within a block. The terminate character is followed by idle characters. However, there is a requirement in the IEEE 802.3 specification that the IPG shall consist of at least 12 bytes on average. The gapping logic functions to ensure that the minimum 12-byte IPG requirement is met by inserting idle characters if needed to maintain the requirement or deleting them if possible to maximize bandwidth utilization. This is accomplished by also meeting the requirement of starting an Ethernet frame at the beginning of a block. Since the requirement is for an average minimum of 12 bytes for the IPG rather than a constant number of bytes, a counter is used to keep track of the number of idle characters comprising the IPG which have deviated from the average minimum of 12. This is the DIC (Deficit Idle Counter) 311. Another counter used for idle character insertion decisions is the SIC (Surplus Idle Counter) 311 whose function will be described later.

The logic for the DIC value uses information, such as the presence of start and terminate characters and the presence of an FCS, to determine the number of idle characters that need to be inserted. When idle characters 342 are inserted, the value of the DIC 311 is also adjusted accordingly. The IPG size between Ethernet frames is therefore maintained at the required average value of 12 bytes minimum without loss of channel capacity. At the same time, the gapping logic ensures that the start of an Ethernet frame always occurs at the beginning of a block of data.

Since the gapping logic has read data from the buffer 309 in accordance with the block format required for the PCS, no further logic is needed to transfer blocks. This is in contrast to the prior art which requires at least an xMII logical interface circuit and rate adapting FIFO. The Ethernet frame data read from the buffer 309 in blocks may be directly processed by the PCS 315.

The PCS 315 is able to recognize the beginning of an Ethernet frame by means of the start character 312 which was inserted by the gapping logic 310. Beginning with the start character, the blocks of Ethernet frame data are processed by the PCS by the encoding and scrambling circuits 319 and distributed among the n lanes 321 of the Ethernet physical media adapter. Encoding is performed on a block basis whereby each 64-bit block is encoded into a 66-bit block. The encoding and scrambling functions and the means to perform these functions are well known to those skilled in the art. The PCS continually process blocks in this manner, including blocks which contain idle characters. The gapping logic 310 has ensured that each block conforms to the required delineation required by the IEEE 802.3 specification and the required number of idle characters.

The distribution of formatted blocks across n lanes 321 is performed in accordance with the requirements of the applicable Ethernet physical layer technology. For example, 40GBASE-SR4 Ethernet over fiber optics employs 4 lanes operating at an aggregate data rate of 41.25 Gb/s. It is noted that at the egress of the PCS, each lane may be transferred to the physical layer adapter by means of a parallel bus.

The PCS 315 also functions to insert periodic alignment blocks 318. The alignment code insertion circuit 320 functions to insert alignment blocks at a period specified in the IEEE 802.3 standard, for example after every 16,383 blocks of data. The alignment blocks may be inserted at any position within the Ethernet frame 322 or IPG 323. In the event that an alignment block has been inserted, a corresponding number of idle characters must be removed. The alignment code insertion logic 320 therefore signals the SIC (Surplus Idle Counter) 311 that an alignment block has been inserted. The gapping logic 310 responds to the signal by ensuring that a number of idle characters corresponding to the length of the alignment block are not inserted for each occurrence of an alignment block. The result is that the egress bandwidth of the PCS is held to a constant value even though an alignment block was added to the Ethernet data.

Embodiments of the present invention therefore accomplish a rate adaptation and compensation for alignment block insertion by the same gapping logic circuit which also functions to generate blocks of data for the PCS. This results in a significant circuit reduction.

Embodiments of the present invention function with better circuit utilization efficiency than the prior art. It is noted that the functionality between the MAC client 341 and physical interface 321 may be entirely compliant to the IEEE 802.3 Ethernet specification, and the interfaces of the invention are compatible with those of the prior art.

Persons skilled in the art may conceive of additional embodiments that contain variations and modifications of the preferred embodiment. Accordingly, any embodiment which falls within the scope of the claims set forth below is to be regarded as part of the invention described herein.

We claim:

1. A packet network interface apparatus, comprising:
a media access control (MAC) module for constructing a packet for transmission over a packet network;
a physical coding sublayer (PCS) module for encoding the packet for transmission over a physical interface; and
an inter packet gap module coupled between the MAC module and the PCS module for directly transferring data to the PCS module while maintaining an inter packet gap by deleting or inserting idle characters, said inter packet gap module comprising at least one memory module for temporary storage of packet data;
wherein the PCS module is configured and arranged to provide a signal to the inter packet gap module in response to the PCS module inserting an alignment block, the inter packet gap module is configured and arranged to delete idle characters in response to the signal from the PCS module, the PCS module is configured without a rate adapting FIFO, and the packet network interface apparatus is configured without a physical media independent interface between the MAC module and the PCS module.

2. The packet network interface apparatus of claim 1, wherein the inter packet gap is a prescribed minimum average.

3. The packet network interface apparatus of claim 2, wherein the at least one memory module temporarily stores said packet data in blocks sized for processing by the PCS.

4. The packet network interface of claim 3, wherein the MAC and PCS modules function within a common clock domain.

5. The packet network interface apparatus of claim 4, wherein the inter packet gap module comprises counter means for counting the surplus or deficit of idle characters relative to the prescribed minimum average.

6. The packet network of claim 5, wherein said counter means comprises a deficit counter for counting the deficit of idle characters and a surplus counter for counting the surplus of idle characters.

7. The packet network interface apparatus of claim 5, wherein the counter means is operative to control read and write operations for the at least one memory module.

8. The packet network interface apparatus of claim 6, wherein the PCS is operative to insert alignment markers, and said counter means is operative to count the number of alignment markers inserted by the PCS.

9. The packet network interface apparatus of claim 6, wherein said inter packet gap module is operative to compensate for the alignment markers inserted by the PCS by controlling the insertion of idle characters required to maintain the inter packet gap.

10. The packet network interface apparatus of claim 5, wherein the inter packet gap module is responsive to said counter means to control the timing of the transfer of packet data to the PCS.

11. The packet network interface apparatus of claim 5, wherein the inter packet gap module is responsive to one or more characters selected from the group consisting of: a frame check sequence (FCS), start and terminate characters to determine the number of idle characters that need to be inserted or deleted.

12. The packet network interface of claim 1, wherein the at least one memory unit generates a backpressure signal for transmission to a MAC client when the at least one memory unit exceeds a fill level.

13. The packet network interface of claim 1, wherein the packet network is an Ethernet network.

14. The packet network interface of claim 1, wherein said MAC module, said inter packet gap module, and said PCS module are implemented on a common integrated circuit.

15. The apparatus of claim 1, wherein at least one of said modules comprises storage medium having stored thereon instructions executable by a processor to perform the function associated therewith.

16. A method of establishing connection between a client and a physical interface in a packet network, comprising:
constructing a packet for transmission over a packet network in a media access control (MAC) module;
storing the packet in a buffer by an inter packet gap module;
encoding the packet for transmission over a physical interface in a physical coding sublayer (PCS) module; and
directly transferring data from the buffer to the PCS module without a physical media independent interface under the control of an inter packet gap module that buffers the data in blocks sized for processing by the PCS and maintains an inter packet gap by deleting or inserting idle characters;
providing a signal from the PCS module to the inter packet gap module in response to the PCS module inserting an alignment block, the PCS module configured without a rate adapting FIFO;
wherein the deleting of idle characters by the inter packet gap module includes deleting idle characters from the buffer is in response to the signal from the PCS module; and
wherein the modules operate in a common time domain.

17. The method of claim 16, wherein the inter packet gap is a prescribed minimum average.

18. The method of claim 16, wherein the inter packet gap module counts the surplus or deficit of idle characters relative to the prescribed minimum average in the inter packet gap module.

19. The method of claim 18, wherein the PCS inserts alignment markers containing idle characters, and the inter packet gap module counts the number of alignment markers inserted by the PCS, and the inter packet gap module compensates for the alignment markers inserted by the PCS by controlling the insertion of idle characters required to maintain the inter packet gap.

20. The method of claim 19, wherein the inter packet gap module controls the timing of the transfer of packet data to the PCS based on the count deficit or surplus count of idle characters.

21. The method of claim 19, wherein the inter packet gap module responds to one or more characters selected from the group consisting of: a frame check sequence (FCS), start and terminate characters to determine the number of idle characters that need to be inserted or deleted.

22. The method of claim 16, wherein inter packet gap module generates a backpressure signal for transmission to a MAC client when the buffered data exceeds a level.

23. The method network interface of claim 16, wherein the packet network is an Ethernet network.

* * * * *